(12) United States Patent
Gavit et al.

(10) Patent No.: US 6,889,927 B2
(45) Date of Patent: May 10, 2005

(54) TAPE THREADING APPARATUS HAVING TAKE-UP HUB WITH GAP FILLING BLOCK FOR DATA STORAGE SYSTEMS AND METHOD THEREFOR

(75) Inventors: Stephan E. Gavit, Littleton, CO (US); Christopher D. Goldsmith, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 3 days.

(21) Appl. No.: 10/189,813

(22) Filed: Jul. 3, 2002

(65) Prior Publication Data

US 2004/0004143 A1 Jan. 8, 2004

(51) Int. Cl.[7] .................................................. G03B 1/58
(52) U.S. Cl. .............................. 242/332.4; 242/332.8; 242/587.2; 360/95
(58) Field of Search ........................... 242/332.4, 332.8, 242/587.2; 360/45

(56) References Cited

U.S. PATENT DOCUMENTS

| | | | | |
|---|---|---|---|---|
| 3,659,804 A | * | 5/1972 | Roman | 242/332.8 |
| 4,709,873 A | * | 12/1987 | Smith et al. | 242/332.8 |
| 5,443,220 A | * | 8/1995 | Hoge et al. | 242/332.8 |
| 5,737,153 A | | 4/1998 | Gavit | |
| 5,777,823 A | | 7/1998 | Gavit | |
| 5,979,813 A | | 11/1999 | Mansbridge et al. | |
| 6,034,839 A | * | 3/2000 | Hamming | 360/95 |
| 6,078,478 A | | 6/2000 | Gavit | |
| 6,142,402 A | * | 11/2000 | Reilly | 242/332.8 |
| 6,364,232 B1 | * | 4/2002 | Nemeth et al. | 242/332.4 |
| 6,437,938 B1 | * | 8/2002 | Wada | 360/95 |
| 6,471,150 B1 | * | 10/2002 | Tsuchiya et al. | 242/332.4 |
| 6,540,167 B2 | * | 4/2003 | Sasaki et al. | 242/332.4 |

* cited by examiner

Primary Examiner—Evan H Langdon
(74) Attorney, Agent, or Firm—Timothy J. Martin; Michael R. Henson; Rebecca A. Gegick

(57) ABSTRACT

A take-up mechanism for a read/write recording apparatus includes a hub with an outer surface about which a tape medium is to be wound. A recess is formed in the outer surface, and a receiver block is reciprocally movable between an extended position and a retracted position. When retracted, an end surface of the receiver block registers with the outer surface of the hub to form a smooth winding surface for the tape. The receiver block has a bay sized to engage the leader block on the tape such that the leader block is enclosed within the hub when the receiver block is retracted. A rotatable drive rotates the hub to wind the tape thereon. This mechanism may be incorporated into a read/write apparatus including a read/write recording head, bearing members to support the tape during transport and a threading assembly to thread the tape through the device.

29 Claims, 5 Drawing Sheets

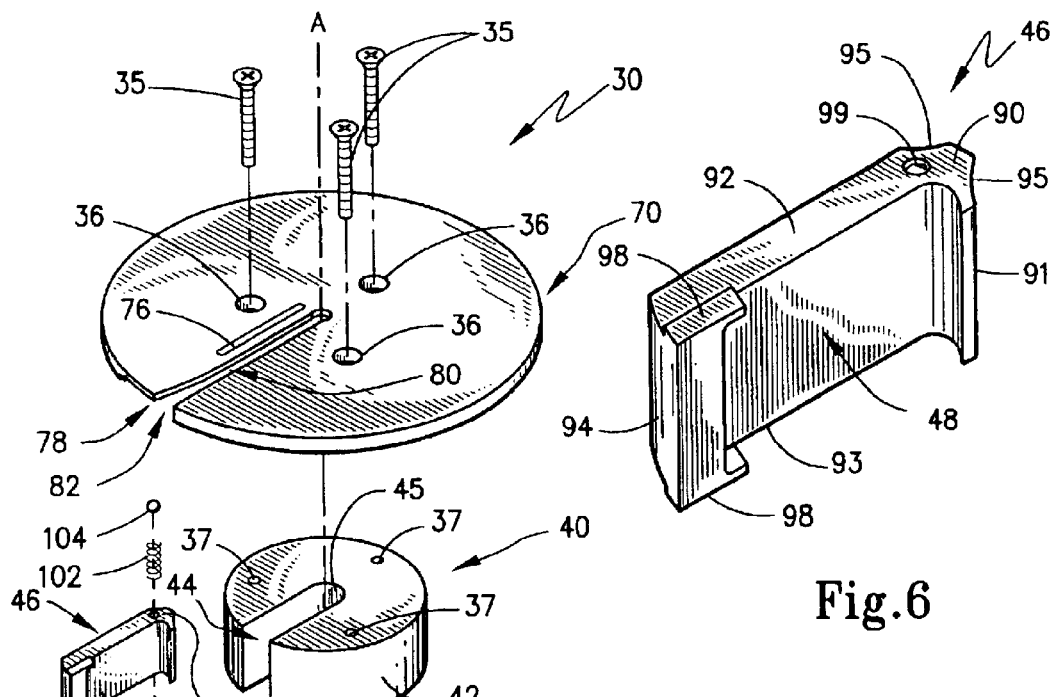
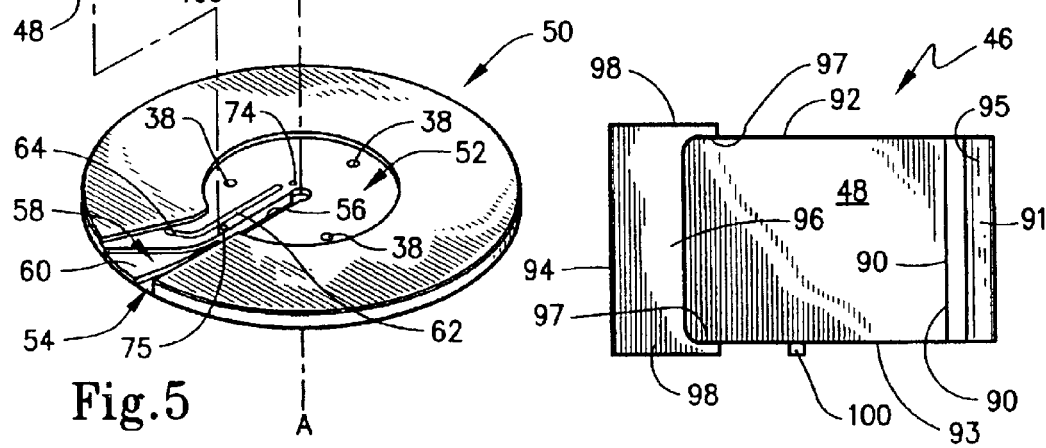
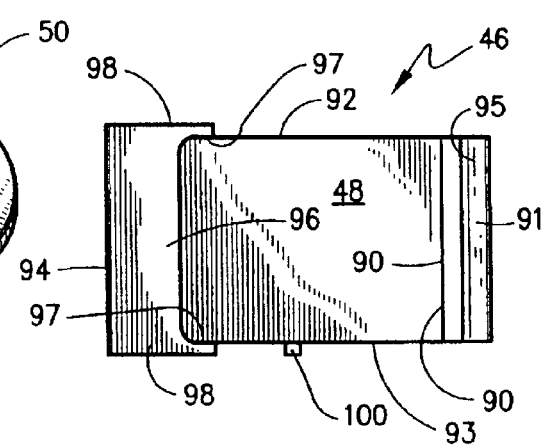
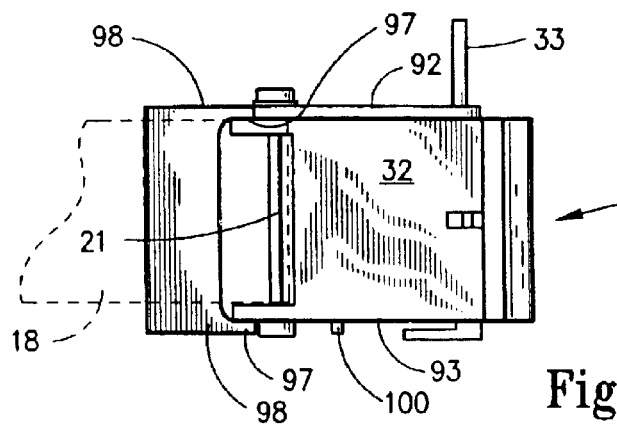

TAPE THREADING APPARATUS HAVING TAKE-UP HUB WITH GAP FILLING BLOCK FOR DATA STORAGE SYSTEMS AND METHOD THEREFOR

FIELD OF THE INVENTION

The present invention broadly concerns methods and apparatus for storing and retrieving data on the tape medium. More specifically, the present invention concerns take-up hubs on tape transport apparatus. The invention particularly concerns a take-up hub that provides a smooth, cylindrical winding surface about which a tape medium may wound in a read/write recording apparatus as well as methods therefor.

BACKGROUND OF THE INVENTION

The advent of the computer has already had a profound effect upon human society, and the impact of processing technology is expected to increase. Indeed, the desirability to store information for subsequent retrieval currently grows at an exponential rate. Thus, various types of devices have been developed to store data both for on-line usage as well as for archival purposes.

Where on-line processing requires data to be readily at hand, a significant improvement was provided by the advent of the magnetic disk storage array. Here, one or more magnetic disks are provided, and a read/write recording head is used to record information on the disk as well as to retrieve information or data for use by the computer processor. Significant strides have been made in the ability to increase the density of data stored on such magnetic disk arrays. In order to gain an even higher density for on-line data, the optical disk was developed. These devices record data based upon a very small wavelength of light so that a higher density is obtained due to this technique. Laser light is employed to read the stored information or data on the optical disk.

In early days of the computer, before the advent of the magnetic disks and the optical disk storage assemblies, data was typically stored on magnetic tapes, such as reel-to-reel tapes and later cassettes. In a magnetic tape storage device, a magnetic coil is used as a transducer both to imprint data magnetically on a moving band of magnetic film; thereafter, when the film is advanced across the transducer, the data may be read and re-input into a co-processor. Magnetic tape can be erased and rewritten many times and has an advantage of low cost.

Magnetic tape is still a highly desirable format for archiving data for rapid access is of less significance and cost is of concern. However, where vast quantities of data are to be maintained, these tapes can be bulky due to the physical number necessary to store the quantity of data. The capacity for such tapes to store data, of course, is dependent upon the number of "tracks" which can be independently placed across the width of the tape.

The ability to write data rapidly onto a magnetic tape film and the accessibility of data to be read from the film is a function of two variables: (1) the density of storage; and (2) the speed at which the tape medium may be transported across and accurately written/read by the transducer. Thus, for example, a magnetic tape read/write system that is able to read and write nine tracks of data on a single strip of tape will hold four and one-half times the amount of data as a system which only utilizes two tracks.

Therefore, efforts to increase the capacity of magnetic tapes to store data have included substantial efforts to increase the number of tracks which can be written on a band of magnetic tape. In the beginning, the speeds associated with the transfer of tape between the storage reel and the take-up reel were relatively slow. The registration of the edges of the tape layers to form the opposite surfaces of the tape pack was not especially critical. Often, the edges of consecutive layers of the tape might be slightly off-set from one another or "stagger-wrapped". In more recent times, the speed of wrapping or winding a tape onto either the storage reel or the take-up reel has increased dramatically. This is especially true in the electronic information storage arena wherein magnetic tape, or "film" or optical tape is used to store data, both for on-line usage as well as for archival purposes.

In the above-described systems, storage reels of tape, whether flanged or flange-less (for example as used in cartridges) may be placed on the machine during use. A threading assembly engages the free end of the tape and passes it through the machine. Typically, the tape is threaded across air bearings, past the transducer and into a take-up hub or reel. The length of the tape is then passed through the machine so that information may be placed on the tape or retrieved therefrom. During this process, the length of tape is transferred onto a take-up reel or hub that is either a part of the machine itself, included within the cartridge or that is mounted and de-mounted from such machine. After being transported through the machine, the tape may be rewound onto the storage reel and removed from the machine.

As was explained in my earlier U.S. Pat. No. 5,777,823, issued Jul. 7, 1998, it is important that the lateral edge of the tape moving in a transport direction be properly registered along a reference plane, called the datum, so that the data may be accurately input and retrieved from the tape medium. Support of the tape during transport is therefore critical, and typically employs guide rollers, air bearing and the like as is known in the art. Improved air bearings are the subject of U.S. Pat. No. 5,777,823 and U.S. patent application Ser. No. 10/111,728 filed Apr. 26, 2002 (priority date Oct. 28, 1999), the disclosures of which are hereby incorporated by reference. It is also important that the read/write head be accurately positionable. A representative structure for such positioning is shown in U.S. Pat. No. 6,078,478, the disclosure of which is hereby incorporated by reference.

Take-up reels are typically constructed to have a central hub that has annular flanges and a width slightly greater than the width of the tape. It is also known to use flange-less hubs in winding tape media. In either case, the hub is rotated about a central winding axis, and the length of tape is wrapped circumferentially around the hub. Such winding results in a tape pack as successive layers of tape build in a radial direction. The edges of the tape generally define a pair of oppositely disposed surfaces generally along planes that are perpendicular to the winding axis. The width of the tape pack is thus defined by the distance between these two planes. The flanges of a flanged reel are intended to protect the tape pack.

As tape transport speeds have increased, a problem has evolved which is interchangeably called "scatterwind" or "stagger-wrap". Where tape is wound at high speed onto a hub, the tape entrains air. That is, air within the boundary of air adjacent to the tape moves into the tape pack and becomes entrapped between the advancing layer and those layers already on the tape pack. Some of this converging wedge of air is laterally displaced at the "nip" which is the point of tangency between the film pack and the incoming (or outgoing) layer of tape. When the tape pack is subsequently brought to rest, the spiral-air bearing is ejected so as to decrease the pack's radius until all adjacent tape layers have come into direct contact. As this occurs, the layers may shift laterally with respect to one another resulting in a tape pack that has a significant amount of stagger wrap. Stagger-wrap presents a problem to the industry where the alignment of the lateral edge of the tape is critical with the read/write transducer. If a tape pack has a significant amount of stagger wrap, the perturbation of this stagger wrap propagates through the advancing tape layer as it is played off of the reel or hub. This causes potential error in either reading or writing the data. Therefore, it is desirable to eliminate the misregistration of the layers forming the tape pack by guiding the registration of the incoming tape layer as it winds onto the hub. The problem of "stagger-wrap" was addressed in U.S. patent application Ser. No. 09/614,575 filed Jul. 12, 2000.

Many tape drives utilize a cartridge which may be mounted or de mounted into the recording and reading apparatus. These cartridges typically contain a spool of tape media upon which information may be stored. The tape media is then transported across the read/write recording head either to place data on a blank tape which you override existing data, as is the case with a "write" operation or, alternatively, to retrieve information that already exist on the tape media during the "read" state. In either case, the tape is typically attached to a connector that either forms a leader block or that is adapted to be engaged by a leader block that is part of the drive mechanism. The drive mechanism engages the free end of the tape by means of the leader block, and mechanically threads the tape across air bearings that ore disposed on either side of read/write recording head. The drive mechanism conveys the leader block to a take-up hub that, typically, is constructed to have a central hub with annual flanges at a width slightly greater than the width of the tape. However, it is known to use flange-less hubs in winding tape media. In either case, the hub is rotated about a central winding axis, and the link of tape is wrapped circumferentially around the hub. Such winding results in a tape pack of successes layers of tape build in radial direction. The flanges of a flanged reel are intended to protect the tapes pack.

As a result of the increasing speeds of winding tape, is important that the tape be wound smoothly and uniformly into the tape pack. Even slight variations in the radius of winding can result in eccentricities of the tape pack. Such eccentricities cause at least two problems. On one hand, if there are small variations in the hub surface or in the resulting tape pack, significant damage to the tape may result with this damage repeating itself over many wraps. Any damage to the tape, of course, can effect the integrity of data that is stored on the tape. In addition, tension variations may occur since the radius of the tape pack itself changes for an instance where the radius is not perfectly uniform. Tension variations effect the tape's stability and decrease the read/write performance of the drive. These tension variations can also create stresses in the tape due to repeated tension cycling. Each of these problems becomes increasingly significant as track density increases.

In one type of threading and take-up assembly, the leader block is shaped so it can fill an opening left in the take-up reel hub, providing a smooth surface upon which the tape must be wound. The primary drawback of this system is that the leader block must be sized according to the gap in the hub and have tolerances that match the hub diameter. In those systems wherein each storage cartridge has its own leader block, there is always some variation, cartridge to cartridge, in the sizing of such leader blocks. These variations result in non-uniformities in the hub diameter when the leader block is mounted in the recess of the hub. Accordingly, the undesired variations in uniformity of the tape pack result.

Where cartridges do not have an integral leader block, such as the case where the tape transport mechanism has its own leader block that engages the free end of the tape, limitations still result. Even though having a leader block as part of the tape drive apparatus improves the tolerance situation, the existing design for most common tape leader pins make it necessary to attach the tape on one side of the leader block because the end must be smooth to match the hub. This creates a need for complex mechanisms to pick the tape. Also, the wind direction of the take-up reel determines which side of the leader block the tape must lay on, which forces the tape to be picked from the corresponding side of the leader block. Otherwise, the tape tension will apply a pull out force on leader block when it is in the take-up hub.

One attempt to address this problem with an internal leader block is described in U.S. Pat. No. 5,979,813 issued Nov. 9, 1999 to Mansbridge et al. In Mansbridge, a take-up hub is provided with a take-up hub having a curve surface portion and a flat mounting area. A leader block is then provided that mounts onto the flat area of the take-up hub and completes the surface in an attempt to provide a smooth, cylindrical winding surface for the tape pack. In essence, the take-up hub, then, has a removed section that forms a leader block, with the take-up hub than having a leader block receiver section that is configured to receive and position the leader block while is connected to the tape to form the continually uniform curve surface.

Despite the advancements set forth in the '813 patent, there remains a need to provide an assembly that will allow the tape picker or tape leader block to be a virtually any configuration. There is a further need to have a system that can be used with a tape picker or a tape leader block that can accommodate manufacturing tolerances. There is a further need to provide a take-up reel structure that allows the tape to be wound in opposite angular directions, and that is independent of the tape picker or leader block design. The present invention is directed to meeting these needs.

SUMMARY OF THE INVENTION

It is an object of the present invention to provide a new and useful take-up hub or reel for use with a tape drive apparatus as well as a method for winding a tape medium on to such a hub.

It another object of the present invention to provide a take-up hub which can accommodate tape pickers or tape leader blocks of different configurations.

It is still a further object of the present invention to provide a take-up hub that can accommodate pickers or tape leader blocks having varying manufacturing tolerances.

Yet another object of the present invention is to provide a take-up hub and method that can allow a tape to wind in different angular rotational directions without compromising the integrity of the winding operation.

Yet a further object of the present invention is to provide a take-up hub and method wherein a winding a surface is provided that is a highly uniform so as to avoid damaging the tape with the transfer of data between the tape and a read/write recording head.

It is still a further object of the present invention to provide a take-up hub and method wherein the uniformity of the winding surface may be controlled during the manufacturing process.

According to the present invention, then, a take-up mechanism is provided to wind a tape medium from a tape source mounted in a tape transport machine that has a threading assembly including a leader block that engages a free end of the tape medium at a tape source and conveys the free end to the take-up mechanism. The take-up mechanism includes a hub having an outer surface about which the tape medium is to be wound. This hub is rotatable about a central axis and has a recess formed through the outer surface. A receiver block is provided that has a base sized and adapted to engage the leader block in a dock state. This receiver block is supported for reciprocal sliding movement between an extended position wherein the leader block can be received into and released out of the bay and a retracted position wherein the receiver block is disposed with in the recess. The receiver block has an end surface that registers with the outer surface of the hub when in the retracted position so that the outer surface and the inner surface together form a substantially smooth winding surface for the tape medium. The bay that is formed in the receiver block is such that the receiver block can move into the retracted position with the leader block in the docked state thereby to capture the leader block within the hub. The take-up mechanism further includes a rotatable drive that is operative to rotate the hub thereby to wind the tape medium thereof.

The outer surface of the hub may be generally cylindrical with the end surface of the receiver block being formed at the same selected radius of curvature so that the winding surface is substantially cylindrical around its entire circumference. The hub can be formed as part of a take-up reel such that there is a first flange extending outwardly of the hub in a plane generally perpendicular to the central axis. A second flange may be provided also to extend outwardly of the hub in a generally parallel spaced apart relation to first flange. In order to guide the receiver block during its reciprocal motion between the extended position and the retracted position, one of the flanges may have guide track formed therein. The receiver block then includes a guide follower that engages the guide track wherein the flange supports the receiver block during reciprocal movement with engagement of the guide follower and the guide track operative to guide the reciprocal movement of the receiver block.

The recess that is formed in the hub may be elongated in a generally radial direction. Moreover, this recess may extend from the outer surface of the hub past the central axis such that the central axis passes through the bay when the receiver block is in the retracted position. This allows the extreme free end of either the tape or the leader block that is secured to the tape to reside generally along the central axis. The receiver block can include detents to retain the receiver block in one or both of the extended position and the retracted position, and this can be accomplished by a common detent assembly. In addition to the guide track and guide follower, one of the flanges can have a cam grove formed therein. Here, the receiver block includes a cam follower that engages the cam grove. The cam groove and the cam follower are operative to cant the receiver block at an angle with respect to the linear direction of travel when the receiver block moves into the extended position. This facilitates the docking and undocking of the receiver block and the bay.

The present invention is also directed to a read/write apparatus that is adapted to receive a spool of tape medium and is operative to perform a read/write function thereon as the tape advances in a forward direction. Here, the read/write apparatus includes a read/write recording head, a first air bearing member located at an upstream location relative to the read/write recording head, a second air bearing member located at a downstream location relative to the read/write recording head, a take-up mechanism that includes a rotatable hub, a rotatable drive operative to rotate the hub to wind the tape medium thereon and a threading assembly including a leader block adapted to engage a free end of the tape medium when the spool is mounted on the read/write apparatus and to convey the free end to the take-up mechanism. The take-up mechanism is of a type described above.

The present invention is also directed to a method of winding a tape medium with a take-up mechanism from a tape source mounted in a tape transport machine that has a threading assembly and that includes a leader block adapted to engage a free end of the tape medium at the tape source and that conveys the free end to the take-up mechanism. This method includes the step of engaging the tape by means of the leader block. Next, the leader block is advanced to a receiver block located at a winding hub that has a first wind area with a receiver block having a second wind area. The method includes a step of co-engaging the leader block and the receiver block as a docked pair and advancing the docked pair relative to the hub such that the second wind area registers with the first wind area thereby to form a substantially co-extensive winding surface about which the tape is to wound. The method includes a rotating the hub thereby the winding tape medium about the winding surface.

The method that's according to the present invention can include a step of reversing the rotation of the hub thereby to unwind the tape medium and transport it back on to the tape source. During this rewinding operation, after the tape is unwound, the docked pair is advanced relative to the hub to move the tape up to extended position. The leader block is then disengaged from the receiver block, and the leader block is then advanced back to tape source where it disengages the tape. The method can also include any step that is inherent in the above described mechanical structure.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 5 is an exploded perspective view of the take-up reel of FIG. 4;

FIG. 6 is a perspective view showing the receiver block used with the take-up reel shown in FIG. 5

FIG. 7 is a front view in elevation of the receiver block shown in FIG. 6;

FIG. 8 is a front view in elevation showing a leader block in a docked state in the receiver block of FIGS. 6 and 7 with the leader block securing the leader pin in the free end of a tape medium (shown in phantom);

DETAILED DESCRIPTION OF THE EXEMPLARY EMBODIMENTS

The present invention broadly concerns tape transport apparatus used in the data storage industry. Such tape transport apparatus employs a tape medium in which data may be placed. Typically, the tape medium resides on a storage reel, which may be in the form of a cartridge. The tape transport apparatus is operative, when a storage reel is mounted thereon, to transport the tape medium in a transport direction across a read/write transducer in order to place or access data on the tape. While the present invention is described specifically with respect to magnetic tape media, it should be understood that the principles described herein may be employed with other type media without restriction. For example, the invention may be used with optical tape as opposed to magnetic tape. Moreover, the term "read/write transducer" as used herein should be understood to refer to write transducer, a read transducer or a transducer that is able to perform both reading and writing functions.

The present invention is particularly directed, however, to a flanged take-up reel that receives a free end of the tape medium by way of a threading mechanism, and thereafter rotates so as to wind the tape medium as a tape pack onto a take-up hub. This should be clearly understood, though, that the present invention is not limited to flanged take-up hubs, but may be employed with take-up hubs that are flange-less without departing from the scope of this invention. Accordingly, unless specified otherwise in the claims, the phrase "hub" can refer to a flanged or flange-less hub in a take-up mechanism. The present invention is concerned with providing a substantially uniform winding surface, that is preferably in cylindrical, upon which the tape pack is to be placed. The invention also concerns the methods accomplished by the hereinafter described structure.

Figure 1:
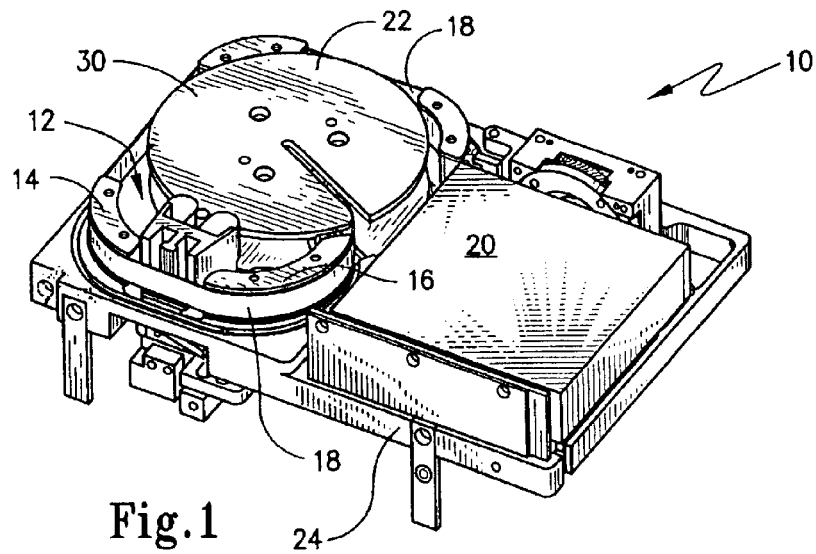
FIG. 1 is a perspective view of a read/write apparatus illustrating the exemplary embodiment of the present invention.
Figure 2:
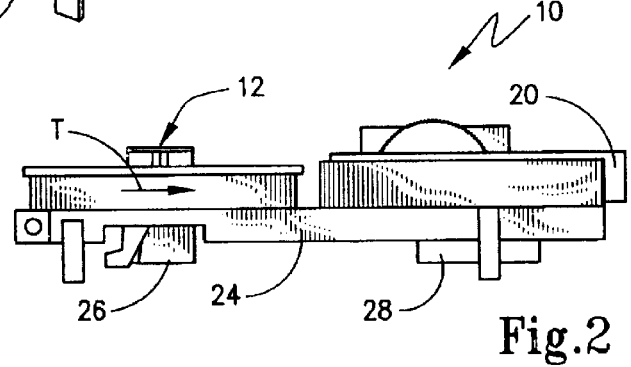
FIG. 2 is a side view in elevation of the read/write apparatus of FIG. 1.

With reference first, then, to FIGS. 1 and 2, diagrams of a representative read/write apparatus 10 are shown. Apparatus 10 includes a read/write transducer 12 that is flanked by an upstream air bearing 14 and a downstream air bearing 16 when a tape 18 is transported in a tape transport direction "T". Tape 18 normally resides in a storage container in the form of cartridge 20 that may be mounted and de-mounted onto apparatus 10. A take-up assembly 22 includes a take-up reel 30 that is rotatable journaled on a frame 24 and is rotated by means of a take-up motor 26 as is known in the art. After performing the desired read/write function, the tape that has previously been wound as a tape pack onto take-up reel 30 may be rewound into cartridge 20 by means of a rewind motor 28.

Figure 3:
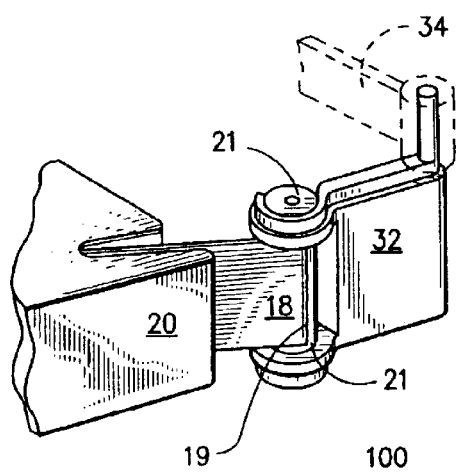
FIG. 3 is a perspective view of a portion a tape storage cartridge having a leader block engaging the leader pin of a tape medium to be driven by a threading assembly (in phantom)

With reference to FIG. 3, it may be seen that the free end 19 of tape 18 may be connected to a leader pin 21 that is adapted to be engaged by a leader block 32, as is known in the art. Alternatively, a leader block may be permanently secured to tape free end 19 of tape 18 so that the leader block 32 resides in cartridge 20 when the cartridge is de-mounted from the apparatus from the read/write apparatus 10. In any event, a threading assembly is employed with the read/write apparatus 10 as is known in the art, with a threading arm 34 being shown in phantom. Threading arm 34 engages leader block 32 at cartridge 20 and advances the leader block, and thus tape 18 across air bearing 14, read/write transducer 12, air bearing 16 and into take-up assembly 22 so that the tape may be wound as a tape pack onto take-up reel 30 during the read/write operation. When the desired function is concluded, the tape that is wound on take-up assembly 22 is unwound in the opposite direction so that leader block 32 is released from take-up reel 30 after which take-up arm 34 reverses its threading operation to release tape 18 at cartridge 20.

Figure 4:
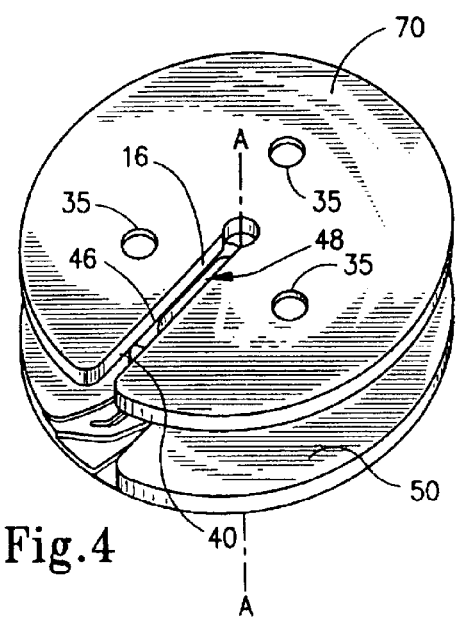
FIG. 4 is a perspective view of a take-up reel according to the present invention.

An important aspect of the present invention is a provision of an improved take-up hub that is associated with take-up reel 30. Take-up reel 30 is best illustrated in FIGS. 4 and 5. With reference to these figures, it may be seen that take-up real 30 includes a take-up hub 40 that is rotatable about a central axis "A". Hub 40 has an outer surface 42 that is formed along a generally cylindrical curve at a selected radius of curvature. Surface 42 defines a surface about which the tape medium, such as tape 18 is to be wound. Hub 40 includes a radially extending, elongated recess 44 formed through the outer surface 42 and extending radially for a distance past the central axis such the central axis "cap a" extends through the inner region of recess 44. A receiver block 46 is sized and adapted to fit into recess 44, as more thoroughly described herein. Receiver block 46 has a bay 48 that is sized and adapted to receive leader block 32. When receiver block 46 is in the retracted position, central axis "A" passes through bay 48, as is shown in FIG. 4.

The assembly of take-up reel 30 is best appreciated in reference to FIG. 5. With reference to this figure, as well as FIG. 4, it may be seen that a first flange 50 is mounted to hub 40 and extend outwardly of hub 40 in plan that would be generally be perpendicular to central axis "A". A second flange 70 is mounted on an opposite side of 42 in generally parallel spaced apart relation to first flange 50. First flange 50 is provided with structure to accommodate reciprocal movement of receiver block 46 and to guide reciprocal motion thereof with respect to recess hub 40 and recess 44, with this structure being described in greater detail below. Likewise, second flange 70 may include a structure to accommodate the movement and biasing of leader block 46. It should be understood, however, that hub 40, first flange 50 and second flange 70 may be assembled by means of a plurality of screws 35 which pass through counter sunk bores 36 in second flange 70, bores 37 in hub 40 to be threadably received in threaded bores 38 and first flange 50.

First flange 50 has a cylindrical cavity 52 sized for close fitting nesting of hub 30 therein. Likewise, second flange 70 has a similar cylindrical cavity (not shown) so that a tight mechanical fit is provided for these primary three pieces that together form reel 30.

Before describing in greater detail the track and guide structure of first flange 50, it is first helpful to review the structure of receiver block 46, in greater detail. Such structure is best shown in FIGS. 6–8. Here, it may be seen that receiver block 46 has a J-shaped configuration with a hooked end 90 that is just slightly smaller but very close to the width of recess 44. Hook end 90 has a surface 91 that is formed at a radius of curvature to mate with inner surface 45 of recess 44 (see FIG. 5). Receiver block 46 has oppositely-spaced parallel walls 92 and 93 that are separated a distance that is generally the same as the height of recess 44 measured along central axis "A". Receiver block 46 has an outer end surface 94 that is formed at the selected radius of curvature as is outer surface 42 such that, when inner surface 91 abuts inner surface 45 of recess 44, outer surface 94 registers with outer surface 42 of hub 40 to define a substantially cylindrical, substantially smooth winding surface for the tape medium. The radius extends for about 0.040 to 0.060 inches, with the remainder being champhered to have flat forces 95. This provides a small area contact and prevents modest debris from interfering with registration of the receiver block 46. In this manner when receiver block 46 is in the retracted position, surfaces 42 and 94 are relatively coextensive along a common geometric cylinder.

Receiver block 46 includes bay 48 that, is as shown in FIG. 8, is sized and adapted to receive leader block 32 in a docked state. End portion 96 of leader block 46 includes a pair of spaced-apart, opposed fingers 97 that help register leader block 32 and help position leader pin 21 in the docked state. It should be understood that bay 48 may be sized so as to accommodate differently configured leader blocks as well as leader blocks having fairly substantial manufacturing tolerances. Guide followers 98 are located on opposite ends of end portion 96 and a cam follower 100 is located along edge 93 the purpose of which is of each of guide followers 98 and cam follower 100 are described in greater detail below.

With reference again to FIGS. 4–6, it may be appreciated that receiver block 46 is releasaby retained in both the extended state and a retracted state by means of a common detent assembly in the form of a coil spring 102 and ball bearings 104 and 106. Spring element 102 is received in bore 99 formed in receiver block 46. When receiver block 46 is in the retracted state, ball bearings 104 and 106 engage detent depressions, such as depression 74 shown with respect to flange 50. When receiver block 46 is in the extended state, ball bearings 104 and 106 engage detent depressions, such as depression 75 shown with respect to flange 50. While not shown, it should be apparent that flange 70 is provided with detent depressions corresponding to depressions 74 and 75.

Receiver block 46 is guided during reciprocal movement by a guide track formed in first flange 50. With reference to FIG. 5, it may be seen that guide track 54 is in the form of elongated radial slot 56 that extends from the periphery of first flange 50 radially to a central location that intersects central axis "A". Slot 56 is formed deep enough so as to receive the head of leader pin 21. Guide track 54 has an outwardly flared mouth 58 including a ledge 60. Ledge 60 is sized so as to allow sliding movement of guide follower 98 along ledge 60 with follower 98 also being moveable within slot 56 of guide track 54. A cam groove 62 extends for a substantial distance in generally parallel relation to slot 56 but terminates in a hooked portion 64 that, as described below, acts to cant receiver block 46 at an angle with respect to it linear sliding direction when the receiver block moves into the extended position. To this end, cam follower 100 of receiver 46 engages cam groove 62 during the guided motion therewith.

With reference again to FIG. 5, it may be appreciated that second flange 70 may, if desired, be provided with a guide track that is symmetric with guide track 54. Thus, as is shown in FIG. 4, second flange 70 includes a guide track 78 that has a slot portion 80 with a flared mouth 82. Guide track 78 receives the guide follower 98 at upper end wall 92 of receiver block 46 in a manner similar to the guide follower 98 along the lower end wall 93 of receiver block 42. It should be understood that slot 80 in second flange 70 extends all the way through the thickness flange 70 so as to allow passage of actuator pin 33 (FIG. 8) of leader block 32. On the other hand, slot 56 of die-track 54 and flange 50 does not extend all the way through the thickness thereof.

Figures 9A, 9B:
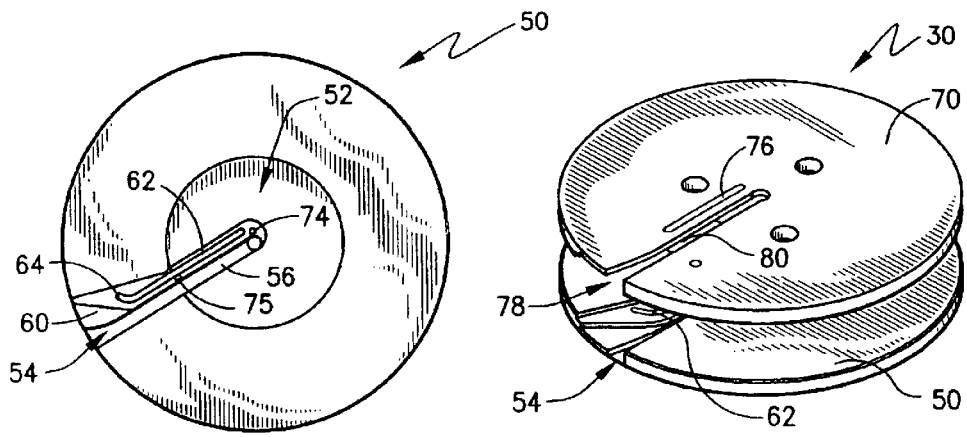
FIG. 9(a) is a top plan view of the first flange of the take-up reel of FIGS. 4 and 5.
FIG. 9(b) is another perspective view of the take-up reel of FIGS. 4 and 5 according to the present invention.
Figures 10A, 10B:
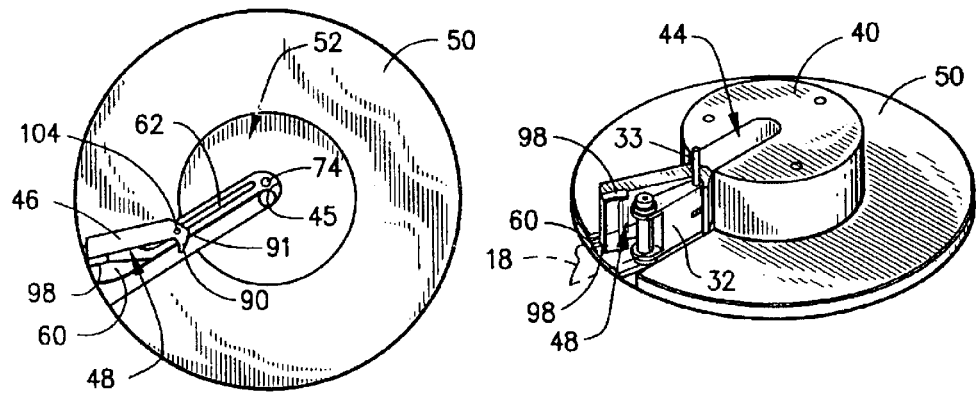
FIG. 10(a) is a top plan view, similar to FIG. 9(a), showing the positioning of the receiver block in the extended position.
FIG. 10(b) is a perspective view similar to FIG. 10(a), and showing a first flange and the hub according to the present invention with the receiver block in an extended position and with a leader block entering the docked state.

The reciprocation of receiver block 46 may now be best appreciated with reference to FIGS. 9–11. FIG. 9(a) and FIG. 9(b) again illustrate the guide track and cam groove structure of flanges 50 and 70 of take-up reel 30. In FIG. 10(a) and FIG. 10(b), it may be seen that receiver block 46 is in the fully extended position. Lower guide follower 98 is supported along ledge 60 with receiver block 46 being canted from its radial direction of linear motion as a result of hook portion 64 of cam groove 62 and the engagement of cam follower 100 therewith. In this position as is shown in FIG. 10(a), bay 48 of receiver block 46 is in a position to either receive or release leader block 32. This procedure is illustrated in FIG. 10(b) where it may be seen that leader block 32 along with tape 18 (in phantom) is either being engaged with or released from bay 48.

Figures 11A, 11B:
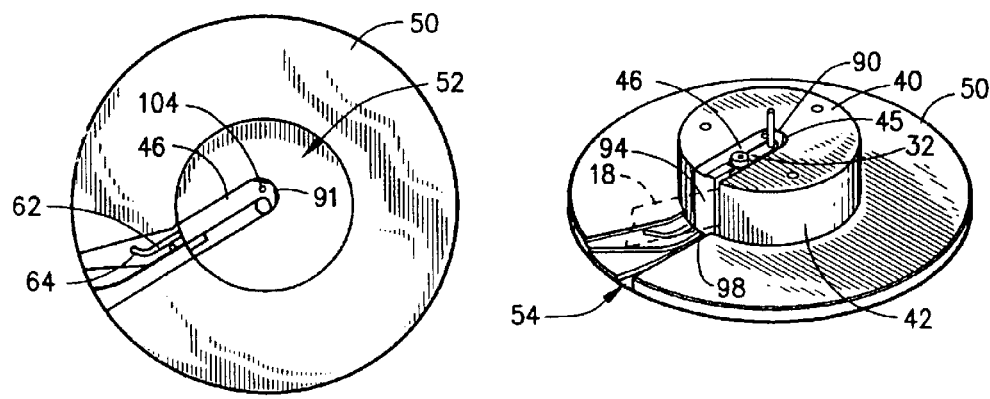
FIG. 11(a) is a top plan view of the first flange and hub assembly of the take-up reel, similar to FIG. 10(a) but showing the receiver block in a retracted position.
FIG. 11(b) is a perspective view, similar to FIG. 10(b), but showing the leader block in a fully docked state with the receiver block in a fully retracted position.

With reference to FIGS. 11(a) and 11(b), it may now be seen that receiver block 46 has been moved into the fully retracted position. Here, leader block 32 has been placed in the docked state with respect to bay 48 and the docked pair has been advanced into recess 44. During his motion of the receiver block 46 from the extended position to the retracted position, cam follower 100 rides in cam groove 62 so that leader block 46 is first aligned with the radial direction by hooked portion 64 after which receiver block 46 is moved in a linear radial direction as a result of guide followers 98 and guide tracks 54 and 78 until hooked end 90 abuts inner surface 45 of recess 44. When this occurs, outer end surface 94 registers with outer surface 42 of hub 40. Since outer surface 94 and hub 42 are formed at the same radius of curvature, a substantially smooth, uniform, contiguous cylindrical wind surface is defined. The registration of surface 94 with surface 42 is controlled entirely upon the machining of receiver block 46 and hub 40, extremely high tolerances can be maintained to insure that the resulting line surface is precise. This precision can be accomplished while allowing relative large manufacturing tolerances and variations and configurations of leader bock 32 so long as leader block 32 fits into the cavity formed by bay 46.

Figure 12:
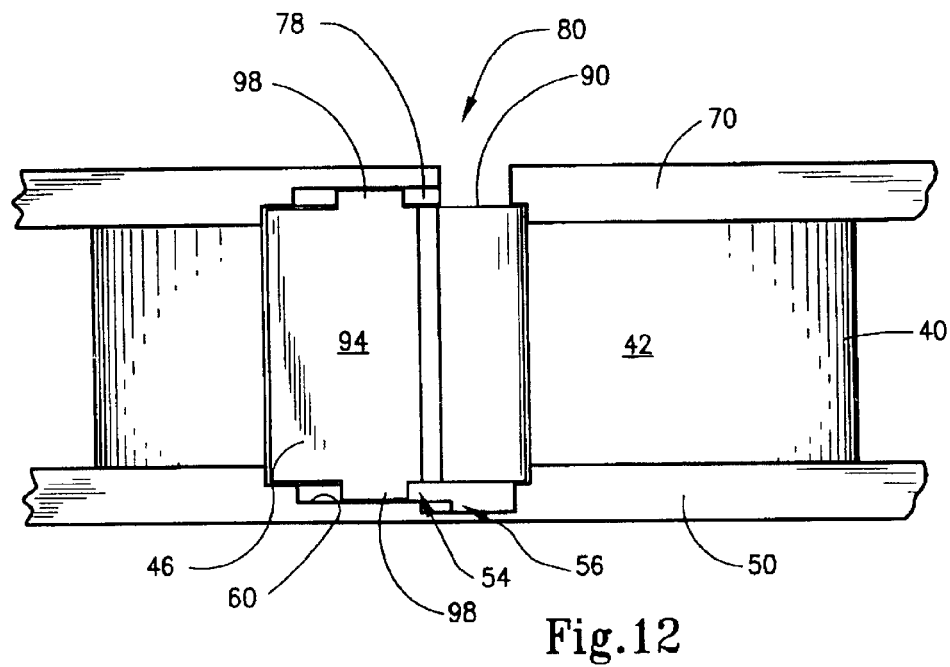
FIG. 12 is an end view in elevation showing a portion of the take-up reel with the receiver block in the extended position looking radially towards the recess in the hub.
Figure 13:
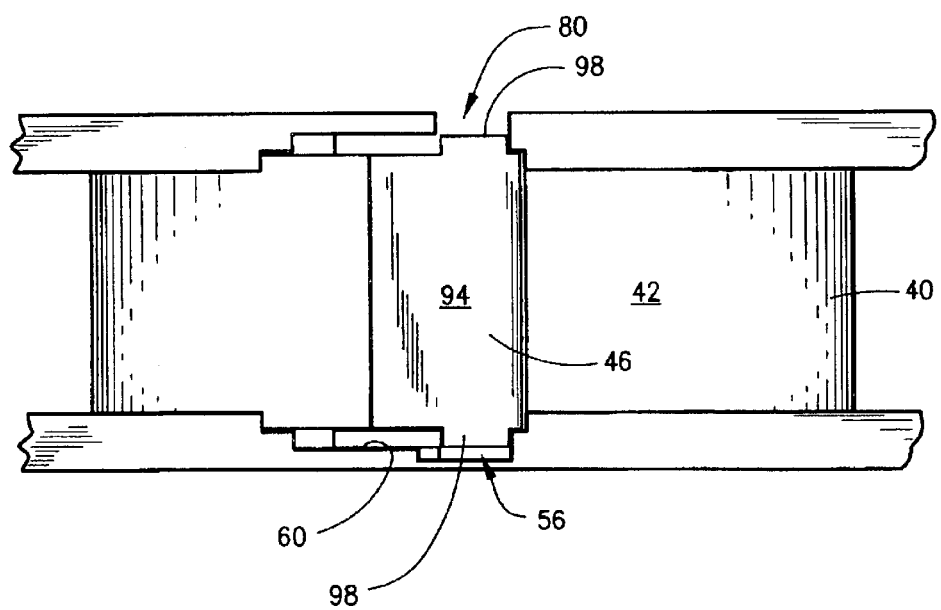
FIG. 13 is an end view in elevation, similar to FIG. 12, but showing the receiver block in the retracted position.

The positioning and guide structure of take-up reel 36 and receiver block 46 is illustrated from another view in FIGS. 12 and 13. FIG. 12 shows receiver block 46 in the extended position with guide followers 98 in the mouths of the respective tracks 54 and 78. Again receiver block 46 is canted at an angle with respect to the linear direction of travel by means of cam follower 100 and cam groove 62 (not shown). In FIG. 13, receiver block 46 is been advanced into the retracted position so that surface 94 thereof registers with surface 42 of take-up hub 40. Here again, it may be seen that guide followers 98 are guided for linear reciprocal motion by slots 56.

Figure 14A:
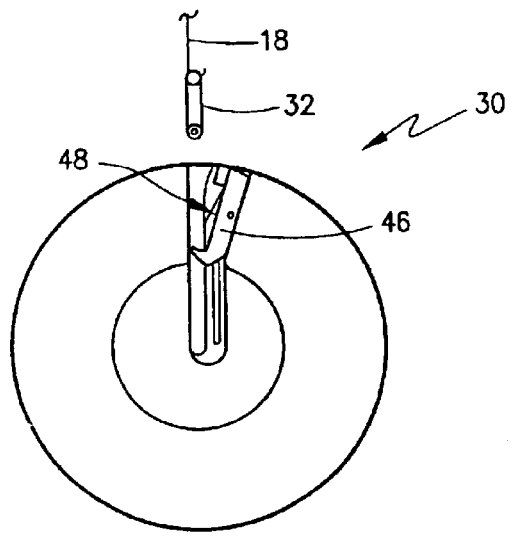
FIGS. 14(a)–14(f) show top plan views of the first flange and hub assembly, with a second flange remove, but dramatically showing the over center spring as the leader block moves from a position receiving and then docking the leader block and moving into the retracted position.
Figure 14B:
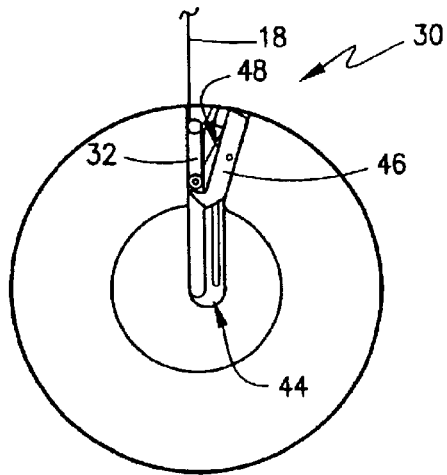
Figure 14C:
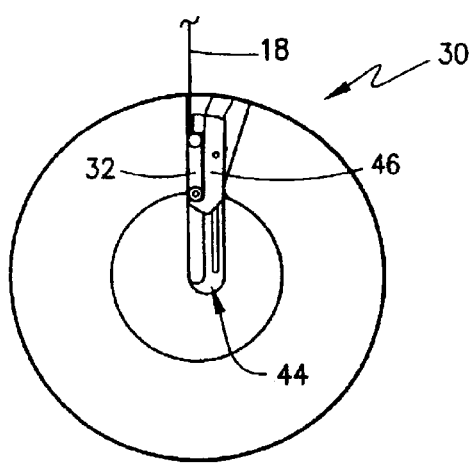
Figure 14D:
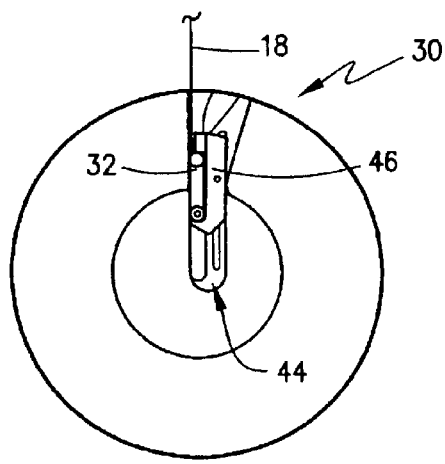
Figure 14E:
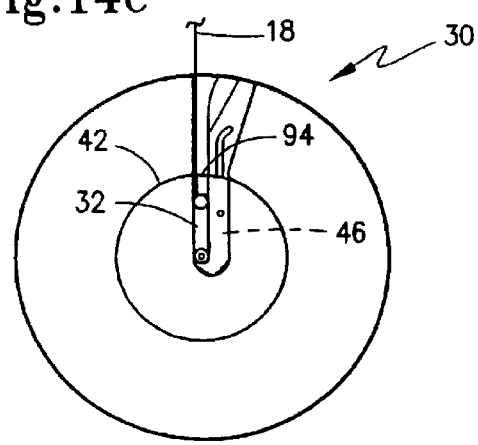
Figure 14F:
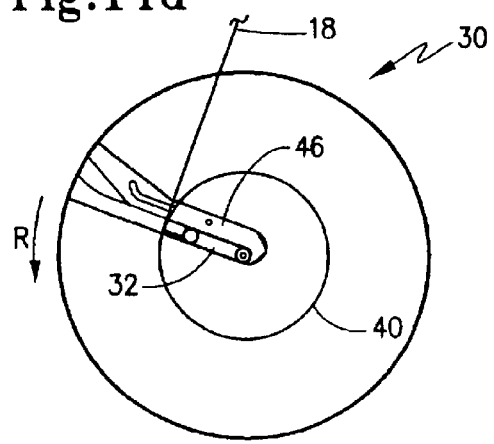

Turning, finally, to FIG. 14(a) through FIG. 14(f) a complete cycle of the mounting leader block 32 and the associated end of tape 18 into take-up reel 30 is diagramed. In FIG. 14(a), take-up reel 30 is in a position to receiver leader block 32 in bay 48 of receiver block 46. At this stage, take-up reel 30 is not being rotated, and receiver block 46 is in the extended position with the detent assembly assisting in this regard. Next, as is shown in FIG. 14(b), the threading apparatus advances leader block 30 into bay 48 by virtue of the fact that receiver block 46 is canted with respect to its linear direction of travel. Continued advancement of leader block 32 by the threading mechanism causes leader block 32 to move into the docked state as the cam follower and cam groove cause leader block 46 to align with the linear direction of travel. The advancement receiver block 46 into recess 44 continues, as is shown in FIG. 14(d). Finally, after advancement of leader block 46 into recess 44, receiver block 46 is in the fully retracted position with the detent assembly assisting in holding receiver block 46 in the retracted position. Surface 94 has now registered with surface 42 and take-up reel 30 may be rotated in the direction of arrow "R". To wind tape 18 around take-up hub 40. In order to dismount tape 18 and leader block 32, the process is repeated to return receiver block 46 into the extended position, as is shown in FIG. 14(a).

The present invention, as noted above, is directed also to method of winding a tape medium with a take-up mechanism from a tape source mounted in a tape transport machine that has a threading assembly that includes a leader block adapted to engage a free end of the tape medium at a tape source and to convey the free end to the take-up mechanism. The method of this invention includes any of the steps that are accomplished by the structure described above. More particularly, though, the exemplary method of the present invention includes a first step of engaging the tape by means of leader block. This can be accomplished either where the leader block is affixed to the tape in the cartridge and the engagement is accomplished by the take-up mechanism. Alternatively, the leader block may be part of the take-up mechanism with the leader block then engaging the leader pins of a tape medium.

In any event, after the tape is engaged by the leader block, the method includes a step of advancing the leader block to a receiver block located at a winding hub that has a first wind area with the receiver block having a second wind area. The leader block and the receiver block are then co-engaged as a docked pair. Next, the docked pair is advanced relative to the hub such that the second wind area registers with the first wind area thereby forming a substantially co-extensive winding surface about which the tape is to be wound. Thereafter, the hub is rotated thereby to wind the tape medium about the winding surface.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A take-up mechanism adapted to wind a tape medium from a tape source mounted in a tape transport machine that has a threading assembly including a leader block adapted to engage a free end of a tape medium at the tape source and to convey the free end to the take-up mechanism, said take-up mechanism comprising:

(A) a hub having an outer surface about which the tape medium is to be wound, said hub rotatable about a central axis and having a recess formed therein through the outer surface;

(B) a receiver block having a bay sized and adapted to engage said leader block in a docked state, said receiver block disposed in the recess and supported for reciprocal sliding movement between an extended position state wherein a portion of said receiver block extends outwardly of the outer surface of said hub such that said leader block can be received into and released out of the bay and a retracted position wherein said receiver block is disposed within the recess, said receiver block having an end surface that registers with the outer surface of said hub when in the retracted position so that the outer surface and the end surface together form a substantially smooth winding surface for said tape medium, the bay sized such that said receiver block can move into the retracted position with said leader block in the docked state thereby to capture said leader block within said hub; and (C) a rotatable drive operative to rotate said hub thereby to wind said tape medium thereon.

2. A take-up mechanism according to claim 1 wherein the outer surface of said hub is generally cylindrical at a selected radius of curvature and wherein the end surface of said receiver block is formed at the selected radius of curvature such that the winding surface is substantially cylindrical.

3. A take-up mechanism according to claim 2 wherein said recess is elongated in a generally radial direction.

4. A take-up mechanism according to claim 1 including a detent assembly operative to releasably retain said receiver block in the extended position.

5. A take-up mechanism according to claim 1 including a detent assembly operative to releasably retain said receiver block in the retracted position.

6. A take-up mechanism according to claim 1 including a common detent assembly operative to releasably retain said receiver block in both the extended position and into the retracted position.

7. A take-up mechanism according to claim 1 including a take-up reel formed by said hub along with a first flange extending outwardly of said hub in a plane generally perpendicular to the central axis, said first flange having a guide track formed therein and said receiver block including a guide follower that engages the guide track whereby said first flange supports said receiver block during reciprocal movement with engagement of said guide follower in the guide track operative to guide the reciprocal movement of said receiver block.

8. A take-up mechanism according to claim 7 wherein the reciprocal movement of said receiver block is generally in linear direction, said first flange having a cam groove formed therein and said receiver block including a cam follower engaging the cam groove, the cam groove and said cam follower operative to cant said receiver block at a angle with respect to the linear direction when said receiver block moves into the extended position.

9. A take-up mechanism according to claim 7 wherein said take-up reel includes a second flange extending outwardly of said hub in a generally parallel spaced-apart relation to said first flange.

10. A tape transport and take-up assembly adapted to wind a tape medium from a tape source mounted in a read/write tape transport machine that has a threading assembly including a leader block adapted to engage a free end of a tape medium at the tape source and to convey the free end to the take-up mechanism, said take-up mechanism comprising:

(A) a hub having an outer substantially cylindrical surface portion formed at a selected radius of curvature about which the tape medium is to be wound, said hub rotatable about a central axis and having a recess formed therein through the outer surface;

(B) a receiver block having a bay sized and adapted to engage said leader block in a docked state, said receiver block disposed in recess of said hub and supported for reciprocal sliding movement between an extended position wherein a portion of said receiver block extends outwardly of the outer surface of said hub that said leader block can be received into and released out of the bay and a retracted position wherein said receiver block is disposed within the recess, said receiver block having an end surface that is formed at the selected radius of curvature and that registers with the outer surface of said hub when in the retracted position so that the outer surface and the end surface together form a substantially smooth cylindrical winding surface for said tape medium, the bay sized such that said receiver block can move into the retracted position with said leader block in the docked state thereby to capture said leader block within said hub;

(C) a detent assembly associated with said receiver block and operative to releasably retain said receiver block in both the extended position and the retracted position; and (D) a rotatable drive operative to rotate said hub thereby to wind said tape medium thereon.

11. A take-up mechanism according to claim 10 including a take-up reel formed by said hub along with a first flange extending outwardly of said hub in a plane generally perpendicular to the central axis, said first flange having a guide track formed therein and said receiver block including a guide follower that engages the guide track whereby said first flange supports said receiver block during reciprocal movement with engagement of said guide follower in the guide track operative to guide the reciprocal movement of said receiver block.

12. A take-up mechanism according to claim 11 wherein the reciprocal movement of said receiver block is generally in linear direction, said first flange having a cam groove formed therein and said receiver block including a cam follower engaging the cam groove, the cam groove and said cam follower operative to cant said receiver block at a angle with respect to the linear direction when said receiver block moves into the extended position.

13. A take-up mechanism according to claim 12 wherein said take-up reel includes a second flange extending outwardly of said hub in a generally parallel spaced-apart relation to said first flange.

14. A read/write apparatus adapted to receive a spool of tape medium and operative to perform a read/write function thereon as said tape medium advances in a forward direction, comprising:

(A) a read/write recording head;

(B) first bearing member located at an upstream location relative to said read/write recording head and second bearing member located at a downstream location relative to said read/write recording head;

(C) a take-up mechanism;

(D) a threading assembly including a leader block adapted to engage a free end of the tape medium when said spool is mounted on the read/write apparatus and to convey the free end to the take-up mechanism, said take-up mechanism including (1) a hub having an outer surface about which the tape medium is to be wound, said hub rotatable about a central axis and having a recess formed therein through the outer surface; and (2) a receiver block having a bay sized and adapted to engage said leader block in a docked state, said receiver block disposed in the recess of said hub and supported for reciprocal sliding movement between an extended position wherein a portion of said receiver block extends outwardly of the outer surface of said hub such that said leader block can be received into and released out of the bay and a retracted position wherein said receiver block is disposed within the recess, said receiver block having an end surface that registers with the outer surface of said hub when in the retracted position so that the outer surface and the end surface together form a substantially smooth winding surface for said tape medium, the bay sized such that said receiver block can move into the retracted position with said leader block in the docked state thereby to capture said leader block within said hub; and (E) a rotatable drive operative to rotate said hub thereby to wind said tape medium thereon.

15. A read/write apparatus according to claim 14 wherein the outer surface of said hub is generally cylindrical at a selected radius of curvature and wherein the end surface of said receiver block is formed at the selected radius of curvature such that the winding surface is substantially cylindrical.

16. A take-up mechanism according to claim 15 wherein said recess is elongated in a generally radial direction.

17. A take-up mechanism according to claim 14 including a common detent assembly operative to releasably retain said receiver block in both the extended position and into the retracted position.

18. A take-up mechanism according to claim 14 including a take-up reel formed by said hub along with a first flange extending outwardly of said hub in a plane generally perpendicular to the central axis, said first flange having a guide track formed therein and said receiver block including a guide follower that engages the guide track whereby said first flange supports said receiver block during reciprocal movement with engagement of said guide follower in the guide track operative to guide the reciprocal movement of said receiver block.

19. A take-up mechanism according to claim 18 wherein the reciprocal movement of said receiver block is generally in linear direction, said first flange having a cam groove formed therein and said receiver block including a cam follower engaging the cam groove, the cam groove and said cam follower operative to cant said receiver block at a angle with respect to the linear direction when said receiver block moves into the extended position.

20. A take-up mechanism according to claim 18 wherein said take-up reel includes a second flange extending outwardly of said hub in a generally parallel spaced-apart relation to said first flange.

21. A method of winding a tape medium with a take-up mechanism from a tape source mounted in a tape transport machine that has a threading assembly including a leader block adapted to engage a free end of a tape medium at the tape source and to convey the free end to the take-up mechanism, comprising:

(A) engaging the tape medium by means of said leader block;

(B) advancing the leader block to a receiver block located at a winding hub that has a first wind area, said receiver block having a second wind area and being slidably and reciprocally secured to said winding hub so as to move between an extended position wherein a portion of said receiver block extends outwardly of the outer surface of said hub and a retracted position wherein said receiver block is disposed within the recess;

(C) co-engaging said leader block and said receiver block as a docked pair in the extended position;

(D) slidably advancing said docked pair relative to said hub to the retracted position such that the second wind area registers with the first wind area thereby forming a substantially coextensive winding surface about which said tape is to be wound; and (E) rotating said hub thereby to wind said tape medium about said winding surface.

22. The method according to claim 21 including the steps of:

(A) after a portion of the tape medium has been wound about said winding surface, rotating said hub to unwind said tape medium from the winding surface and rewinding the tape medium into the tape source;

(B) disengaging said leader block and said receiver block;

(C) advancing said leader block to the tape source; and (D) disengaging the tape medium from said leader block.

23. The method according to claim 21 wherein said receiver block moves between an extended position and a retracted position and including the step of releasably retaining said receiver block in the extended position.

24. The method according to claim 21 wherein said receiver block moves between an extended position and a retracted position and including the step of releasably retaining said receiver block in the retracted position.

25. The method according to claim 21 wherein said receiver block moves between an extended position and a retracted position and including the steps of releasably retaining said receiver block in both the extended and retracted positions.

26. The method according to claim 21 wherein said receiver block moves between an extended position and a retracted position and including the step of positively guiding said receiver block during such movement.

27. A take-up mechanism adapted to wind a tape medium from a tape source mounted in a tape transport machine that has a threading assembly including a leader block adapted to engage a free end of a tape medium at the tape source and to convey the free end to the take-up mechanism, said take-up mechanism comprising:

(A) a hub having an outer surface about which the tape medium is to be wound, said hub rotatable about a central axis and having a recess formed therein through the outer surface;

(B) a receiver block having a bay sized and adapted to engage said leader block in a docked state, said receiver block supported for reciprocal sliding movement between an extended position wherein said leader block can be received into and released out of the bay and a retracted position wherein said receiver block is disposed within the recess and wherein said recess extends from the outer surface of said hub past the central axis such that the central axis passes through the bay when said receiver block is in the retracted position, said receiver block having an end surface that registers with the outer surface of said hub when in the retracted position so that the outer surface and the end surface together form a substantially smooth winding surface for said tape medium, the bay sized such that said receiver block can move into the retracted position with said leader block in the docked state thereby to capture said leader block within said hub; and (C) a rotatable drive operative to rotate said hub thereby to wind said tape medium thereon.

28. A read/write apparatus adapted to receive a spool of tape medium and operative to perform a read/write function thereon as said tape medium advances in a forward direction, comprising:

(A) a read/write recording head;

(B) first bearing member located at an upstream location relative to said read/write recording head and second bearing member located at a downstream location relative to said read/write recording head;

(C) a take-up mechanism;

(D) a threading assembly including a leader block adapted to engage a free end of the tape medium when said spool is mounted on the read/write apparatus and to convey the free end to the take-up mechanism, said take-up mechanism including (1) a hub having an outer surface about which the tape medium is to be wound, said hub rotatable about a central axis and having a recess formed therein through the outer surface wherein said recess extends from the outer surface of said hub past the central axis; and (2) a receiver block having a bay sized and adapted to engage said leader block in a docked state, said receiver block supported for reciprocal sliding movement between an extended position state wherein said leader block can be received into and released out of the bay and a retracted position wherein said receiver block is disposed within the recess such that the central axis passes through the bay when said receiver block is in the retracted position, said receiver block having an end surface that registers with the outer surface of said hub when in the retracted position so that the outer surface and the end surface together form a substantially smooth winding surface for said tape medium, the bay sized such that said receiver block can move into the retracted position with said leader block in the docked state thereby to capture said leader block within said hub; and (E) a rotatable drive operative to rotate said hub thereby to wind said tape medium thereon.

29. A tape transport and take-up assembly adapted to wind a tape medium from a tape source mounted in a read/write tape transport machine that has a threading assembly including a leader block adapted to engage a free end of a tape medium at the tape source and to convey the free end to the take-up mechanism, said take-up mechanism comprising:

(A) a hub having a substantially cylindrical outer surface portion formed at a selected radius of curvature about which the tape medium is to be wound, said hub rotatable about a central axis and having a recess formed therein through the outer surface portion;

(B) a receiver block having a bay sized and adapted to engage said leader block in a docked state, said receiver block supported for reciprocal sliding movement between an extended position wherein said leader block can be received into and released out of the bay and a retracted position wherein said receiver block is disposed within the recess, said receiver block having an end surface that is formed at the selected radius of curvature and that registers with the outer surface of said hub when in the retracted position so that the outer surface and the end surface together form a substantially smooth cylindrical winding surface for said tape medium, the bay sized such that said receiver block can move into the retracted position with said leader block in the docked state thereby to capture said leader block within said hub, the recess in said hub being elongated in a generally radial direction from the outer surface portion of said hub past the central axis such that the central axis passes through the bay when said receiver block is in the retracted position;

(C) a detent assembly associated with said receiver block and operative to releasably retain said receiver block in both the extended position and the retracted position; and (D) a rotatable drive operative to rotate said hub thereby to wind said tape medium thereon.

* * * * *